(12) United States Patent
Tatsumi

(10) Patent No.: US 7,164,496 B2
(45) Date of Patent: Jan. 16, 2007

(54) IMAGE CORRECTION APPARATUS

(75) Inventor: Setsuji Tatsumi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 688 days.

(21) Appl. No.: 09/880,840

(22) Filed: Jun. 15, 2001

(65) Prior Publication Data
US 2001/0052992 A1    Dec. 20, 2001

(30) Foreign Application Priority Data
Jun. 15, 2000   (JP) .............................. 2000-179578

(51) Int. Cl.
*G06K 9/40* (2006.01)
(52) U.S. Cl. ...................... 358/1.9; 382/275
(58) Field of Classification Search .................. 358/1.9, 358/2.1, 1.2, 1.4; 382/254, 275
See application file for complete search history.

(56) References Cited

U.S. PATENT DOCUMENTS

| | | | | |
|---|---|---|---|---|
| 4,482,924 A | * | 11/1984 | Brownstein | 358/302 |
| 5,075,787 A | * | 12/1991 | Shaughnessy et al. | 358/452 |
| 5,138,465 A | * | 8/1992 | Ng et al. | 358/453 |
| 5,266,805 A | * | 11/1993 | Edgar | 250/330 |
| 5,663,569 A | * | 9/1997 | Hayano | 250/559.45 |
| 5,680,473 A | * | 10/1997 | Kanzaka et al. | 382/141 |
| 5,751,343 A | * | 5/1998 | Hibino et al. | 348/96 |
| 6,014,471 A | * | 1/2000 | Barkan et al. | 382/275 |
| 6,278,797 B1 | * | 8/2001 | Nagasaki et al. | 382/146 |
| 6,393,161 B1 | * | 5/2002 | Stevenson et al. | 382/275 |
| 6,529,618 B1 | * | 3/2003 | Ohara et al. | 382/132 |

FOREIGN PATENT DOCUMENTS

JP         2559970         9/1996

* cited by examiner

*Primary Examiner*—Thomas D. Lee
*Assistant Examiner*—Stephen Brinich
(74) *Attorney, Agent, or Firm*—Birch, Stewart, Kolasch, and Birch, LLP

(57) ABSTRACT

The image correction apparatus includes an image reading unit for reading a print image of an original image, where a mark is given to a defect on an image and an image correction unit for correcting image data of the original image by utilizing the position of the mark on a read image read by the image reading unit. The image correction apparatus efficiently corrects an image defect visually recognized on the print image without using an infrared ray, when the print image is output from image data of the original image.

10 Claims, 3 Drawing Sheets

IMAGE CORRECTION APPARATUS

BACKGROUND OF THE INVENTION

The present invention relates to an image correction apparatus that performs image correction to an image defect included in image data, that is, a portion where correction is necessary. More specifically, the invention relates to an image correction apparatus that corrects an image defect caused by a defect such as a scratch and dust on a film image read out photoelectrically by using a film scanner and the like.

In recent years, a new technology has been introduced and this is a printer that relies upon digital exposure. Briefly, an image recorded on a film is read photoelectrically, converted to digital signals and subjected to various image processing operations to produce image data for recording purposes; recording light that has been modulated in accordance with the image data is used to scan and expose a photosensitive material to record a latent image, which is subsequently developed to produce a finished print. The printer operating on this principle has been commercialized as a digital photoprinter.

In the digital photoprinter, the film is read photoelectrically and subjected to image (signal) processing for gradation correction or the like to thereby determine exposing conditions. Hence, by image processing, editing of a print image including composition of a plurality of images into one composite image or division of a single image into more than one image, and various image processing operations including color/density adjustment, edge enhancement and the like can be performed freely. Thus, print images can be output after processing has been done in accordance with a specific use. Further, the image data of the print images can be supplied into a computer or the like and stored in recording media such as a floppy disk.

Further, the digital photoprinter is capable of outputting prints of higher image quality which are excellent in the resolution, color/density reproducibility and the like as compared to prints by means of the conventional direct exposure.

Having these features, the digital photoprinter is basically composed of an image input machine having a scanner that reads an image on a film photoelectrically and converts to image data and an image processing apparatus that subjects the image data to processing (image processing) to determine exposing conditions thereby producing image data for recording purposes as well as an image output machine (a printer) that scan exposes a photosensitive material in accordance with the image data output for recording purposes, and performs development and other necessary processing on the exposed material to produce a print.

In the scanner, reading light emitted from a light source is allowed to be incident on the film, from which projected light bearing the image recorded on the film is produced and focused by an imaging lens to form a sharp image on an image sensor such as a CCD sensor; the image is then read by photoelectric conversion and sent to the image processing apparatus as image data of the image on the film (i.e., image data signals) after being optionally subjected to various image processing operations. In the scanner, the carrier mounted on the scanner feeds the film frame by frame whereby the image photographed in each frame of the film is sequentially read one by one.

The image processing apparatus sets image processing conditions for subjecting the image data to color balance adjustment, contrast compensation (gradation processing), brightness correction and chroma correction, and optionally each correction for transverse chromatic aberration, distortion and color shift, and electronic scale conversion, optionally followed by sharpness processing and dodging processing. Image processing as determined by the thus set conditions is performed on the image data and the resulting image data for image recording (i.e., exposing conditions) are sent to the printer.

In the printer, if it is of a type that relies upon exposure by scanning with an optical beam, the latter is modulated in accordance with the image data sent from the image processing apparatus and deflected in a main scanning direction as the photosensitive material is transported in an auxiliary scanning direction perpendicular to the main scanning direction, whereby a latent image is formed as the result of exposure (printing) of the photosensitive material with the image bearing optical beam. Development and other processing as determined by the photosensitive material are then performed to produce a print (photograph) reproducing the image that was recorded on the film.

Incidentally, the print output from the digital photoprinter may include a fine image defect on an actual read image due to a defect physically existing on a frame of the film, for example, a scratch on the film and dust attached to the film. When the reading light emitted from the light source is allowed to be incident on the film to produce projected light bearing the image recorded on the film, if the image of the scratch on the frame of the film or the image of the dust attached to the film is also included in the projected light bearing the image together with the image recorded in the frame, the scratch or dust is also imaged thus causing this defect. The image defect of this kind, that is, the image defect due to the scratch, dust and the like on the film have a problem that the image quality is reduced.

Therefore, Japanese Patent No. 2559970 proposes a method for compensating adverse effects of defects caused in a recording medium such as a film. According to the method adopted therein, infrared ray is used to detect a defect such as a scratch on the film and a level of the defect is determined from the energy distribution intensity of the infrared ray.

However, this method is not sufficient for detecting the image defect caused by the scratch on the film or the dust attached to the film during film scanning so as to efficiently correct the defect in a digital manner.

Alternatively, in the case where the red-eye of a subject person which sometimes occurs in the subject image photographed with a strobe flash, is corrected as the image defect, the method applied is not sufficient for efficiently detecting the red-eye to correct it efficiently in a digital manner. Particularly, when a plurality of subject persons are photographed such as in a group photograph, it is difficult to correct the red-eye phenomenon of all the subject persons efficiently.

On the other hand, it is difficult for an operator to detect the defect such as the scratch and dust on the image one by one with good accuracy while looking at the image displayed on an image display monitor, because the defect on the image is fine. Thus, missing of the detection occurs many times. This also makes the operator to perform a troublesome work.

This kind of problem is not limited to the case where an image recorded on a film is read by the scanner to provide image data. The problem of the image defect included in the image data also occurs in the case where a print is output from image data recorded in a recording medium such as a floppy disk, a PC card, an MO disk (a magneto-optical disk)

or the like. For example, in the image photographed by a digital still camera, the image defect due to a defect of an image pickup element is recorded. Thus, the defect to be corrected occurs on the image.

SUMMARY OF THE INVENTION

To solve the above-described problems, an object of the present invention is to provide an image correction apparatus in which, when an image defect included in image data is corrected, the image defect visually recognized on a print image but compensated or corrected with difficulty by complete automation can be corrected efficiently.

In order to attain the object described above, the present invention provides an image correction apparatus, comprising: an image reading unit for reading a print image of an original image, where a mark is given to a defect on an image; and an image correction unit for correcting image data of the original image by utilizing a position of the mark on a read image read by the image reading unit.

It is preferable that the image correction apparatus further comprises an image display unit for displaying an image of the image data in an enlarged state corresponding to the position of the mark on the read image.

Preferably, the image correction unit detects the position of the mark by comparing the image data of the original image with the image data of the read image.

BRIEF DESCRIPTION OF THE DRAWINGS

FIG. 1 is a block diagram showing a constitution of a digital photoprinter where one embodiment of an image correction apparatus of the present invention is built in;

DETAILED DESCRIPTION OF THE INVENTION

The image correction apparatus of the present invention will be described below in detail with reference to the preferred embodiment shown in the accompanying drawings.

Figure 1:
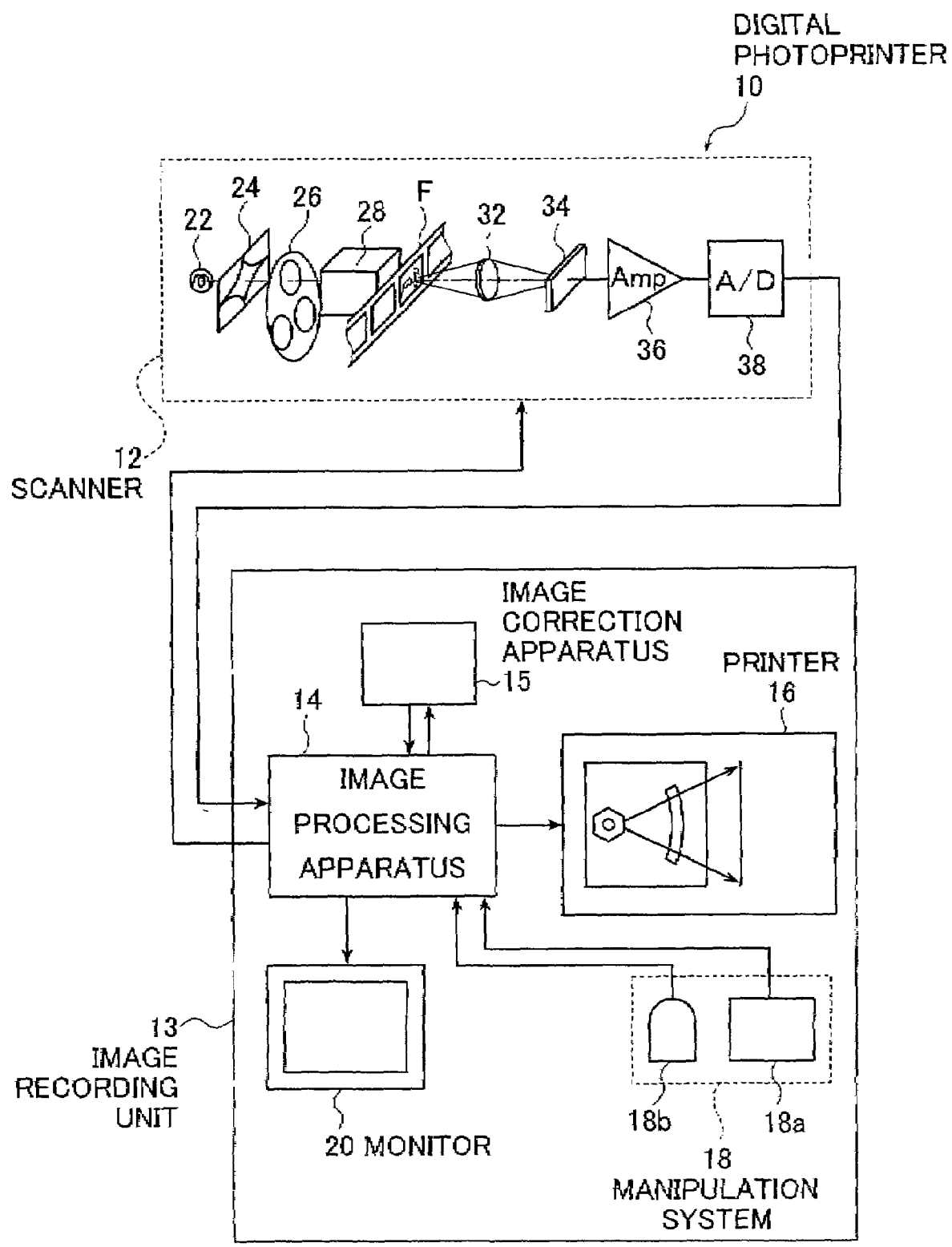

FIG. 1 shows a block diagram of one example of a digital photoprinter 10 where one embodiment of the image correction apparatus of the present invention is built in.

Basically, the digital photoprinter (hereinafter, referred to as a photoprinter) 10 shown in FIG. 1 mainly comprises a scanner 12 for photoelectrically reading an image on a film F and an image recording unit 13.

The image recording unit 13 mainly comprises an image processing apparatus 14 for performing image processing on image data (image information) read by the scanner 12; an image correction apparatus 15 for efficiently correcting an image defect visually recognized on a print image; and a printer 16 in which a photosensitive material is exposed by an optical beam modulated in accordance with the image data having been processed in the image processing apparatus 14 and corrected in the image correction apparatus 15, and developed to output a print.

The image recording unit 13 comprises a manipulation system 18 having a keyboard 18a and a mouse 18b for performing input (setting) of various conditions, for selecting specific processing steps as in marking a position of an image defect that requires correction such as a scratch erasing or in performing instruction and designation necessary for the correction such as the scratch erasing as described hereinafter; and a monitor 20 for displaying an image read by the scanner 12, various kinds of manipulation instructions, a setting/registration screen of various conditions, an enlarged display image for accurately specifying the position of the image defect, and the like. The manipulation system 18 and the monitor 20 are connected to the image correction apparatus 15 via the image processing apparatus 14, or connected to each portion of the image processing apparatus 14.

Herein, "the image defect" (hereinafter, also simply referred to as the defect) includes a scratch on an original image, dust and a stain attached thereto when reading the image, and a region of a certain area having different chromaticity, brightness and chroma from those of the peripheral region which may appear on the image due to the defect of the image pickup element used for reading the image by the scanner 12 or the like. Further, the defect includes the red-eye that sometimes occurs in the image photographed with a strobe flash and which requires correction of the image data.

The scanner 12 is an apparatus for photoelectrically reading the images recorded on the film F frame by frame. The scanner 12 comprises a light source 22; a variable diaphragm 24 for adjusting the quantity of reading light in accordance with the image recorded on the film F; a filter plate 26 having three color filters of R (red), G (green) and B (blue) for dividing the image into the three primary colors of R, G and B, which is rotated to insert an optional color filter on an optical path; a diffusion box 28 for making reading light as a visible ray incident onto the film F uniform in the surface direction of the film F; an imaging lens unit 32; a CCD sensor 34 as an area sensor for reading the image in one frame of the film; an amplifier 36; and an analog/digital (A/D) converter 38.

In the scanner 12 of the illustrated photoprinter 10, exclusive carriers are prepared which are detachable from the body of the scanner 12 depending on the kind and the type of the film such as a negative film used in Advanced Photo System or a 135 size negative film, the form of the film such as a strip or a slide, and the type of the processing such as trimming. By replacing a carrier with another, the photoprinter 10 can cope with various films and processing.

The carrier feeds the film F frame by frame, and the image in each frame is sequentially transported to a predetermined reading position. The scanner 12 sequentially reads the image of each frame on the film F one by one.

With regard to reading of the image by the scanner 12, two scanning operations, that is, a pre-scan and a fine scan are performed. The pre-scan for reading the image in a low resolution is performed to determine the image processing conditions and the like, which is performed prior to reading the image for outputting a print (the fine scan). The fine scan for reading the image in a high resolution is performed after the operator has confirmed and adjusted the image displayed on the monitor.

An output signal (image data) from the scanner 12 is output to the image processing apparatus 14.

Figure 2:
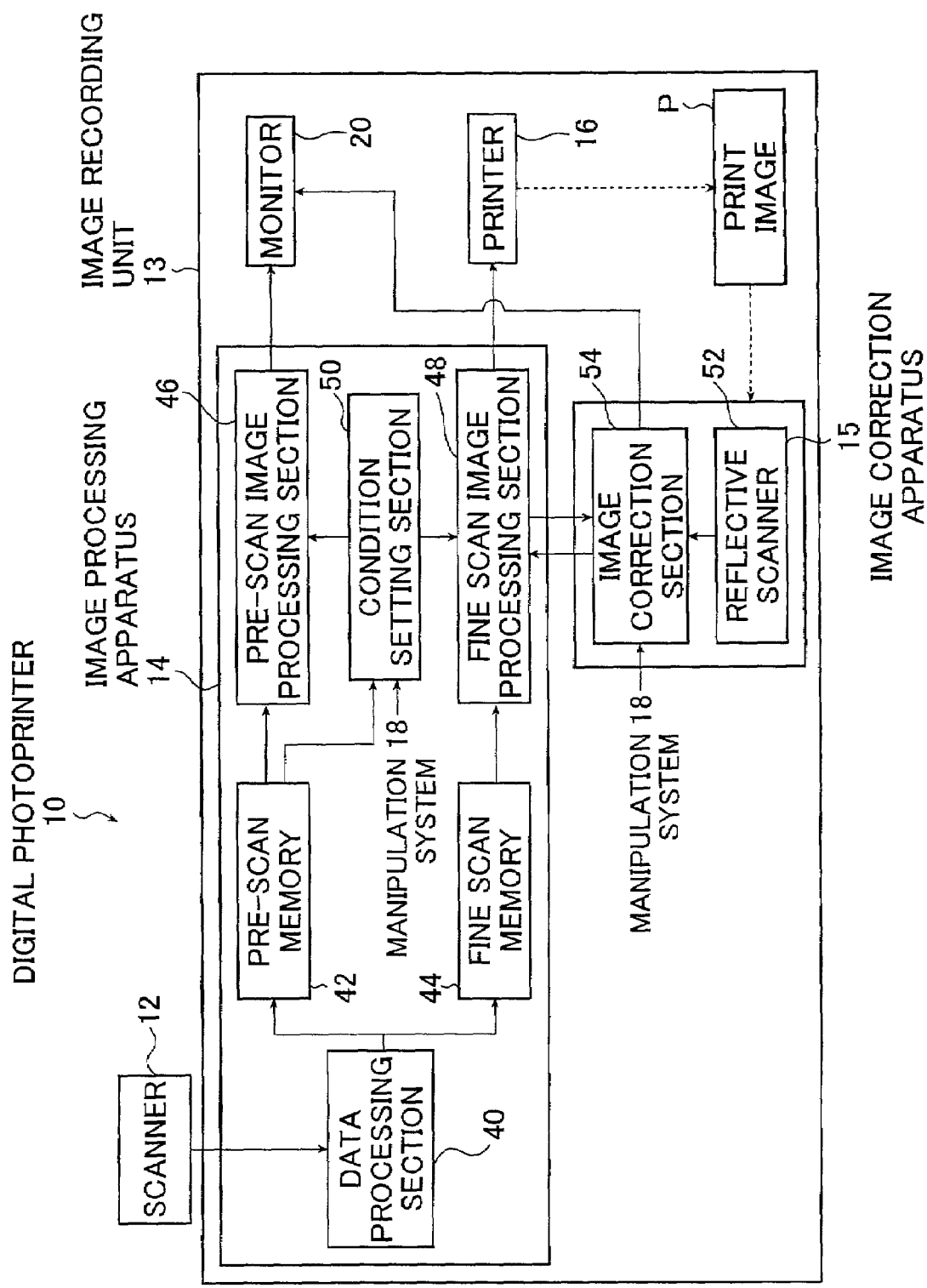
FIG. 2 is a block diagram showing a constitution of a principle portion of the image recording apparatus shown in FIG. 1.

FIG. 2 shows a block diagram of the image recording unit 13. The image processing apparatus 14 comprises a data processing section 40; a pre-scan (frame) memory 42; a fine scan memory 44; a pre-scan image processing section 46; a fine scan image processing section 48; and a condition setting section 50.

The data processing section 40 performs a Log conversion, a DC offset correction, a dark correction, a shading correction and the like for each output signal of R, G and B from the scanner 12, thus obtaining digital input image data. The pre-scan (image) data is stored (recorded) in the pre-scan memory 42, and the fine scan (image) data is stored (recorded) in the fine scan memory 44.

The pre-scan memory 42 and the fine scan memory 44 are memory sections where input image data processed in the data processing section 40 are stored. The input image data are read out to the pre-scan image processing section 46 or the fine scan image processing section 48 as required to output after image processing has been performed.

The pre-scan image processing section 46 is the section that performs image processing such as color balance adjustment, contrast compensation and brightness correction based on the image processing conditions automatically determined by using the pre-scan image data or adjusted by the operator in the condition setting section 50 (described later), and further performs correction of transverse chromatic aberration, correction of distortion and correction of color shift of the scanner as required. Moreover, the pre-scan image processing section 46 is the section that further performs electronic scale conversion processing and then performs sharpness processing, dodging processing and the like as required, and thereafter, processes the image data into the one suitable for displaying on the monitor 20 and sends the image data to the monitor 20 for determining the image processing conditions.

The fine scan image processing section 48 performs color balance adjustment, contrast compensation (gradation processing), brightness correction and chroma correction on the fine scan image data based on the image processing conditions determined by the pre-scan image data, and further performs correction of transverse chromatic aberration, correction of distortion and correction of color shift as required. The fine scan image processing section 48 further performs electronic scale conversion processing, and thereafter, performs sharpness processing, dodging processing and the like as required. Furthermore, the fine scan image processing section 48 converts the thus processed image data into the one suitable for the printer 16, which is then sent to the printer 16.

The condition setting section 50 is used for reading out the pre-scan image data from the pre-scan memory 42 to determine the image processing conditions. Specifically, the condition setting section 50 uses the pre-scan image data to form density histograms and calculate image characteristic quantities such as a mean density, an LATD (large area transmission density), a highlight (a minimum density) and a shadow (a maximum density). In addition, the condition setting section 50 constructs look-up tables (LUTs) for gray balance adjustment and the like, and formulates matrix arithmetic operations for chroma correction in accordance with an instruction as required entered by the operator, thus setting the image processing conditions. The thus set image processing conditions are set again after having been subjected to adjustment by the operator. Further, the thus set processing conditions are used for the fine scan fine data in the fine scan image processing section 48 after having been verified by the operator and finalized.

Note that FIG. 2 mainly shows portions related to the image processing. In addition to these portions, a CPU for performing control and management of the entire photoprinter 10 including the image processing apparatus 14, a memory for storing information necessary for the operation and the like of the photoprinter 10, a unit for determining a diaphragm value of the variable diaphragm 24 and a storage time of the CCD sensor 34 for fine scan, and the like are arranged in the image processing apparatus 14. The manipulation system 18 and the monitor (the image display unit) 20 are connected to each portion via the CPU and the like (a CPU bus). Moreover, a recording medium reading/writing apparatus which reads out image data photographed by a digital still camera or the like from a recording medium such as a floppy disk or a PC card to provide image data for use in the image processing apparatus 14 may be connected thereto.

The printer 16 comprises a recording device (a printing device) for exposing a photosensitive material (a photographic paper) in accordance with the fine scan image data supplied to record a latent image thereon, and a processor (a developing device) for performing a predetermined development process on the exposed photosensitive material to output as a print. In the recording device, the photosensitive material is cut to a specified length in accordance with the size of the final print; thereafter, three light beams for exposure to R, G and B in accordance with the spectral sensitivity characteristics of the photosensitive material are modulated in accordance with the image data output from the processing apparatus 14; the three modulated light beams are deflected in the main scanning direction while, at the same time, the photosensitive material is transported in the auxiliary scanning direction perpendicular to the main scanning direction so as to record a latent image thereon by two-dimensional scan exposure with the light beams; the latent image bearing photosensitive material is supplied to the processor, where it is subjected to a wet development process comprising color development, bleach-fixing and rinsing, then dried to produce a print; the thus produced prints of a specified unit number for example corresponding to a film roll are sorted and stacked.

The monitor 20 is the section in which the pre-scan image processed in the pre-scan image processing section 46 is displayed for verification, the fine scan image processed in the fine scan image processing section 48 is displayed in an enlarged state, and the read-out image read by a reflective scanner 52 is displayed.

The image correction apparatus 15 comprises the reflective scanner 52 which corresponds to one embodiment of the image correction apparatus according to the present invention and which is used as an image reading unit, and an image correction section 54 used as an image correction unit.

The reflective scanner 52 is the one for reading, as a reflection original, a print image P on which a mark is given to a position of the defect that needs correction, the defect being manifested to be visibly recognizable on the print image P output from the printer 16.

The image correction section 54 is the section in which the image data of the original image, that is, the fine scan image data of the original image recorded on the film F to which the image processing has been applied in the fine scan image processing section 48 is corrected by utilizing the position of the mark on the print image read by the reflective scanner 52 so that the image defect that needs correction can be removed.

Specifically, the image correction section 54 is constituted as follows: The image data of a read-out image P' obtained by the operator's reading of the print image P having the mark with the reflective scanner 52 is compared with the fine scan image data to which the image processing has been applied in the fine scan image processing section 48. The position of the mark on the read-out image P' is detected, and a region including the defect that needs correction of the fine scan image data is set by using the mark position detected. The region set so as to specify the accurate position of the defect that needs correction is displayed on the monitor 20 in an enlarged state and the defect is corrected according to an instruction.

Figure 3:
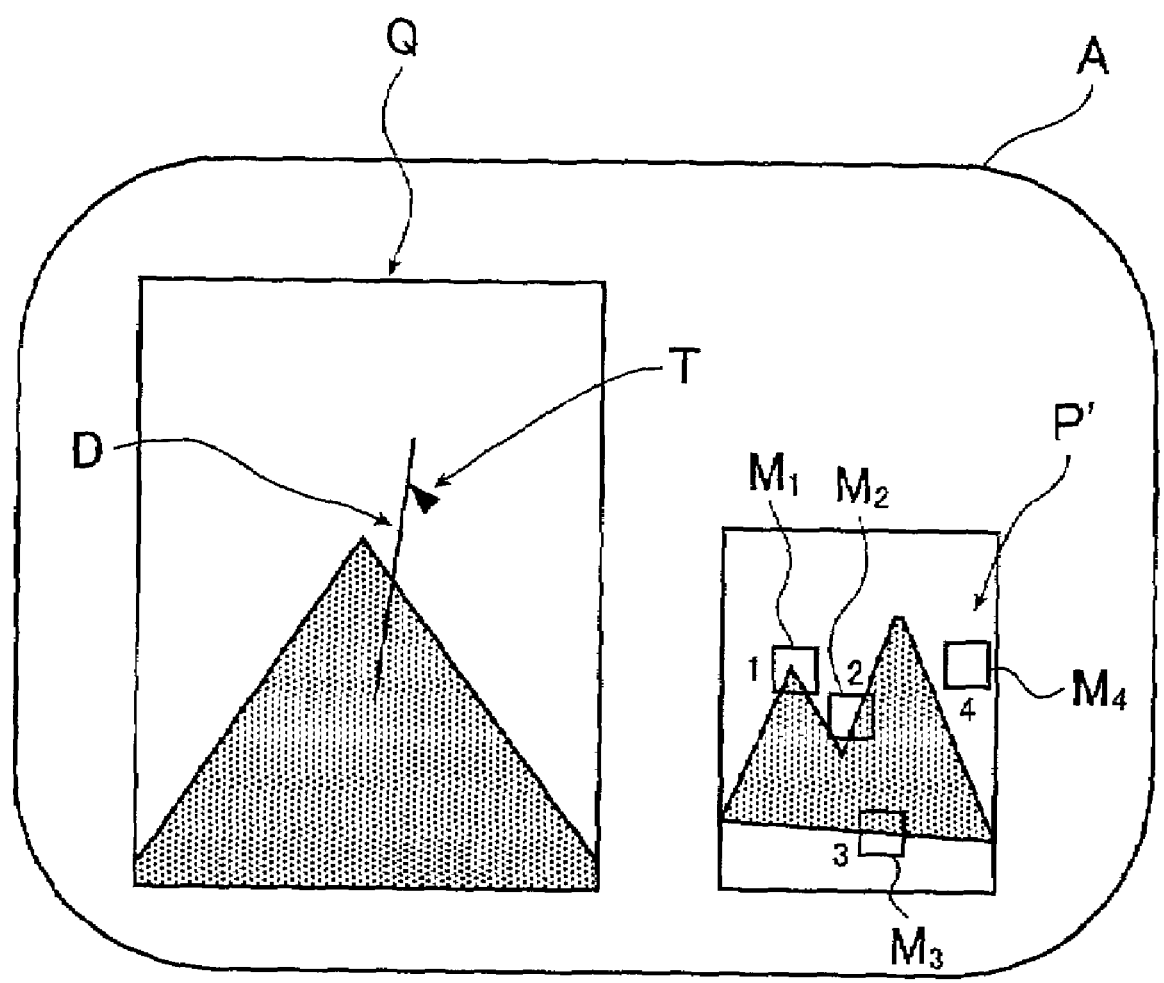
FIG. 3 is a view showing one example of a screen regarding an image correction, which is displayed on a monitor shown in FIG. 2.

FIG. 3 shows a screen A as one example of the screen displayed on the monitor 20. The entirety of the read-out image P' is displayed on the right of the screen A, square □ marks $M_1$ to $M_4$ marked by the operator by hand at the defects that need correction are displayed. Further, the positions of the marks given are automatically detected by comparing the image data of the read-out image P' with the fine scan image data, and then identification numbers of 1 to 4 are automatically given to the vicinity of the square □ marks $M_1$ to $M_4$. Herein, since many of the defects that need correction are small and fine, there are few cases where the defects are displayed on the monitor 20 by the display of the entirety of the read-out image P'. In the case of the example of FIG. 3, the defects that need correction are not displayed. However, as shown in an enlarged display image Q in FIG. 3, a portion of the image of the fine scan image data corresponding to the square □ mark $M_1$ of the read-out image P' is displayed on the screen A in an enlarged state, and thus the defect that needs correction is displayed. In the example of the enlarged display image Q of FIG. 3, a linear scratch defect D is displayed. Such enlargement of the image may be performed automatically or by an instruction entered by clicking the mouse 18b or the like. Detection of each of the square □ marks $M_1$ to $M_4$ marked by hand for performing automatic image enlargement only requires determination of a difference between the fine scan image data and the image data of the read-out image P'. Since both image data are essentially the same, each square o mark added to the read-out image P' by hand is detected as a result of the difference. The operator can specify the position of the defect accurately on the monitor screen while looking at the defect such as the scratch defect D which needs correction as displayed on the monitor 20 in an enlarged state. The read-out image P' is read out from the print containing the fine scan image data and hence the read-out image P' coincides with the fine scan image for the relative relationship between the image size and the position to be specified. Assuming here that the fine scan image has an image size of X×Y, the read-out image P' has an image size of Xp×Yp, and the coordinates of the position to be specified for correction are (x,y), the coordinates of the position of the fine scan image data to be displayed in an enlarged state, (xq, yq) are determined by the following equations:

$$xq=x\times(X/Xp)$$

$$yq=y\times(Y/Yp)$$

In FIG. 3, a triangular ▲ mark T accurately specifies one pixel corresponding to the scratch defect D that needs correction.

With regard to the above-described enlarged display image Q, by specifying the inside region of the square □ shown by the square □ marks $M_1$ to $M_4$ of the read-out image P' by clicking the mouse 18b or the like, the region to be displayed in an enlarged state can be changed to the region corresponding to the square □ mark $M_2$, $M_3$ or the like. Thus, the defect that needs correction as marked with the square □ mark is displayed in an enlarged state, and the position of the defect can be accurately specified.

The image correction performed in the image correction section 54 is a semiautomatic correction, which is performed as follows: After one pixel corresponding to the defective portion that needs correction is specified by the mouse 18b as described above, the entire defect that needs correction is specified from the pixel by using the continuity of the image, and the entire defect is corrected by interpolating from peripheral pixels or by performing the gain adjustment of the image data value from the difference between the defective pixel and the peripheral pixels. Thus, correction and removal of the defect are performed.

Alternatively, the image correction may be performed manually by using the manipulation system 18 such as the keyboard 18a and the mouse 18b. The operator may perform manual correction while looking at the enlarged display image Q shown in FIG. 3. For manual correction, a known method may be used in which peripheral pixels of the defect that needs correction are specified by using the mouse 18b and color information of the pixels is picked up, and the color information of the defective pixel specified by the mouse 18b is blended with that of the peripheral pixels. The image correction section 54 may implement a correction method in which correction data separate from the image data is prepared and substituted therefor, instead of correcting by directly changing the image data based on the information of the image data.

In this type of correction method, when there are a plurality of marks given to the defects as shown in FIG. 3, the positions of the defects are specified in advance by the triangular ▲ marks T or the like at least before starting correction, thus giving the marks correction specifying pointers. Accordingly, the operator rarely fails to correct the defect that needs correction. The fine scan image data corrected in the image correction section 54 is sent to the fine scan image processing section 48 again, converted into the image data adapted for the printer 16, and output to the printer 16. The image correction section 54 may be constituted such that the corrected fine scan image data is recorded (image-recorded) in a recording medium such as a floppy disk, a PC card and an MO disk.

Next, the operation of the image correction apparatus of the present invention will be described based on the digital photoprinter 10 of FIG. 1.

Firstly, the pre-scan is performed by the scanner 12, and the visible light from the light source 22 has its quantity adjusted by means of the variable diaphragm 24. The light is then adjusted through the three R, G and B color filters of the filter plate 26, diffused in the diffusion box 28, and is incident on and passes through the film F to produce projected light bearing the image recorded on a frame of the film F. The projected light from the film F is focused by the imaging lens unit 32 to form a sharp image on the light-receiving plane of the CCD sensor 34, where photoelectric reading is performed. The image signal is amplified with the amplifier 36, converted in the A/D converter 38 and sent to the image processing apparatus 14.

The image signal sent to the image processing apparatus 14 is subjected to the above-described processing in the data processing section 40, and stored to the pre-scan memory 42 as the pre-scan image data.

The pre-scan image data stored in the pre-scan memory 42 is read out to the condition setting section 50, in which density histograms are formed and image characteristic quantities such as a mean density, an LATD (large area transmission density), a highlight (a minimum density) and a shadow (a maximum density) are calculated. In addition, the condition setting section 50 constructs look-up tables (LUTs) for gray balance adjustment and the like, and formulates matrix arithmetic operations for chroma correction in accordance with an instruction as required entered by the operator, thus setting the image processing conditions. The thus set image processing conditions are set again after having been subjected to adjustment by key correction. The conditions having been entirely coordinated are then sent to the pre-scan image processing section 46.

The pre-scan image processing section 46 performs image processing including color balance adjustment, contrast compensation and brightness correction, and further performs correction for transverse chromatic aberration, distortion and color shift of the scanner as required. Furthermore, the pre-scan image processing section 46 performs electronic scale conversion, and thereafter, sharpness processing and dodging processing are performed as required. The image data is converted into the one suitable for displaying on the monitor 20 and then displayed on the monitor 20.

The pre-scan described above is performed for all the images recorded in the frames of the film F before starting the fine scan.

The operator looks at the pre-scan image displayed on the monitor 20 for verification. Then, the fine scan is performed by the scanner 12.

The image on the film F is subjected to the fine scan in the scanner 12 using the three R, G and B color filters. The image is photoelectrically read by the CCD sensor 34, the output signal thereof is amplified by the amplifier 36, and sent to the image processing apparatus 14.

The fine scan image data sent to the image processing apparatus 14 is stored in the fine scan memory 44 and is subjected to the image processing that is performed in the fine scan image processing section 48 under the set image processing conditions. The processed image is converted into the one suitable for the printer 16, and is output to the printer 16.

With regard to the print image P output from the printer 16, if the operator determines that there is an image defect that needs correction, the mark is given to the portion of the image defect. By reproducing the recorded image on the reflection original, namely on the print image P, the operator can find the defect quite easily in comparison to the case where the image is displayed on the monitor 20 or the like.

Thereafter, the print image P to which the mark is given is read by the reflective scanner 52, and the image data of the read-out image P' is sent to the image correction section 54.

In the image correction section 54, the fine scan image data on which the image processing has been performed in the fine scan image processing section 48 is compared with the image data of the read-out image P' read and sent by the reflective scanner 52, and all the positions to which the marks are given on the read-out image P' are detected. Accordingly, the defects that need correction are detected without fail.

After the positions to which the marks are given on the read-out image P' are detected, the region including the defects that need correction of the fine scan image data is set by using the information about the mark positions detected. The region that has been set is displayed on the monitor 20 in an enlarged state as in the enlarged display image Q shown in FIG. 3. The operator manipulates the mouse 18b or the like on the monitor screen to accurately specify the pixel of the defective portion such as a scratch defect D that needs correction as shown by the triangular ▲ mark T in FIG. 3 while looking at the defect on the enlarged display image Q. Then, the operator gives the image correction instruction.

In the case where a plurality of marks are given, accurate positions of the defects are specified for all the regions set in correspondence with the marks.

Thereafter, by using the continuity of the image, the entire defect that needs correction is specified from the pixel of the defective portion accurately specified, and the entire defect is corrected by interpolating from peripheral pixels or by performing gain adjustment of the image data value from the difference between the defective pixel and the peripheral pixels. Thus, correction and removal of the defect are performed. Alternatively, the operator performs the manual correction as described above. Moreover, correction data separate from the fine scan image data is prepared and substituted for the image data of the defective portion.

The fine scan image data from which the defects are corrected and removed is sent to the fine scan image processing section 48 again, converted into the image data adapted for the printer 16, and output to the printer 16. Accordingly, the print image from which the defects are corrected and removed is output from the printer 16. Alternatively, the corrected fine scan image data may be written and stored in a recording medium such as a floppy disk, a PC card and an MO disk.

On the foregoing pages, the image correction apparatus of the present invention has been described in detail, but the present invention is in no way limited to the stated embodiments and various improvements and modifications of course can be made without departing from the spirit and scope of the invention.

As described above in detail, when a print image is output from image data, a defect is corrected by utilizing the positions of the marks included in the defective portion. Therefore, the image defect which is visually recognized on the print image, but which is compensated or corrected with difficulty by complete automation can be efficiently corrected.

Particularly, since the image of the image data corresponding to the position of the mark on the read-out image is displayed in an enlarged state, the operator can perform the semiautomatic correction where the position of the defect is accurately specified from the image displayed in an enlarged state. Alternatively, the operator can perform the manual correction while looking at the image displayed in an enlarged state.

In addition, since the mark positions given to the print image are detected by comparing the image data and the read-out image data read by the image reading unit, the operator can correct all the defects for which the operator determined the necessity of correction.

What is claimed is:

1. An image correction apparatus comprising:
a reflective scanner for reading a print image output from a printer based on print image data, the print image output from the printer having an identifying mark provided at a position of a defect on the print image, thereby obtaining read-out image data which has image data of the identifying mark in addition to the print image data; and
an image correction section for correcting and repairing image data of the defect on said print image by utilizing the position of said identifying mark on the print image output from the printer,
wherein the image correction section corrects the print image data by comparing the read-out image data with the print image data, and the corrected print image data reproduces the image data of the print image without the defect.

2. The image correction apparatus according to claim 1, further comprising:
an image display unit for displaying an image portion of the print image in an enlarged state corresponding to the position of said identifying mark on said print image.

3. The image correction apparatus according to claim 1, wherein said image correction section detects the position of said identifying mark by comparing the print image data with the read-out image.

4. The image correction apparatus according to claim 1, wherein the identifying mark is manually provided by an operator.

5. The image correction apparatus according to claim 1, wherein the defect is indicated by at least one of
a scratch on the print image,
a dust on the print image,
a stain on the print image,
a red-eye of a photographed person in the print image, and
a region having different chromaticity, brightness and chroma from those of a peripheral region of the scanned image due to a defect of a scanning pickup element used for scanning a film.

6. A digital photoprinter comprising:
a scanner for photoelectrically reading an original image on a film, thereby obtaining print image data; and
an image recording unit, said image recording unit further including an image processing apparatus for performing image processing on the print image data;
an image correction apparatus for correcting a defect in the print image data;
wherein said image correction apparatus further includes
a reflective scanner for reading a print image output by a printer, the print image having an identifying mark provided at a position of a defect on the print image, thereby obtaining read-out image data which includes image data of the identifying mark in addition to the print image data; and
an image correction section for correcting image data of said print image by utilizing a position of said identifying mark on the print image output from the printer,
wherein the image correction section corrects the print image data by comparing the read-out image data with the print image data; and
wherein the printer is also capable of outputting a print image that has been processed and corrected in the digital photoprinter.

7. The digital photoprinter according to claim 6, further comprising:
an image display unit for displaying an image portion of the print image in an enlarged state corresponding to the position of said identifying mark on said print image.

8. The digital photoprinter according to claim 6, wherein said image correction section detects the position of said identifying mark by comparing the read-out image data with the print image data.

9. The digital photoprinter according to claim 6, wherein the identifying mark is manually provided by an operator.

10. A digital photoprinter comprising:
a scanner for photoelectrically reading an original image on a film, thereby obtaining print image data; and
an image recording unit, said image recording unit further including an image processing apparatus for performing image processing on the print image data;
an image correction apparatus for correcting a defect in the print image data;
wherein said image correction apparatus further includes
a reflective scanner for reading a print image output by a printer, the print image having an identifying mark provided at a position of a defect on the print image, thereby obtaining read-out image data which includes image data of the identifying mark in addition to the print image data; and
an image correction section for correcting image data of the defect of the print image by utilizing the position of said identifying mark on the print image output by the printer; and
wherein the printer is also capable of outputting a print image that has been processed and corrected in the digital photoprinter,
wherein the image correction section corrects the print image data by comparing the read-out image data of with the print image data,
the digital photoprinter further comprising:
an image display unit for displaying an image of said image data in an enlarged state corresponding to the position of said identifying mark on said scanned image.

* * * * *